United States Patent [19]

Ulry

[11] Patent Number: 4,672,389
[45] Date of Patent: Jun. 9, 1987

[54] INFLATABLE REFLECTOR APPARATUS AND METHOD OF MANUFACTURE

[76] Inventor: David N. Ulry, 4380 Donington Rd., Columbus, Ohio 43220

[21] Appl. No.: 738,258

[22] Filed: May 28, 1985

[51] Int. Cl.[4] ............................................. H01Q 15/20
[52] U.S. Cl. ...................... 343/915; 343/880
[58] Field of Search ................ 343/915, 912, 880

[56] References Cited

U.S. PATENT DOCUMENTS

| | | | |
|---|---|---|---|
| 2,977,596 | 3/1961 | Justice | 343/915 X |
| 3,001,196 | 9/1961 | McIlroy et al. | 343/915 |
| 3,176,302 | 3/1965 | Tipton | 343/915 X |
| 3,452,355 | 6/1969 | Slater et al. | 343/915 X |
| 3,916,418 | 10/1975 | Erdmann et al. | 343/912 |
| 4,232,320 | 11/1980 | Savalle, Jr. | 343/882 X |
| 4,251,819 | 2/1981 | Vickland | 343/882 |

FOREIGN PATENT DOCUMENTS

| | | | |
|---|---|---|---|
| 0606642 | 11/1960 | Canada | 343/915 |
| 0884894 | 12/1961 | United Kingdom | 343/915 |

Primary Examiner—Daniel M. Yasich
Attorney, Agent, or Firm—Robert B. Watkins

[57] ABSTRACT

An inflatable reflector structure used to receive and transmit energy, and a mounting and support system for an inflatable reflector structure, together with a method of constructing a concave parabolic reflective or transparent membrane, capable of being formed into an envelope and inflated. The reflector structure includes an inflatable and collapsible envelope means maintained in configuration by a compression frame member means and by a fluid within the envelope at super ambient surrounding pressure.

16 Claims, 17 Drawing Figures

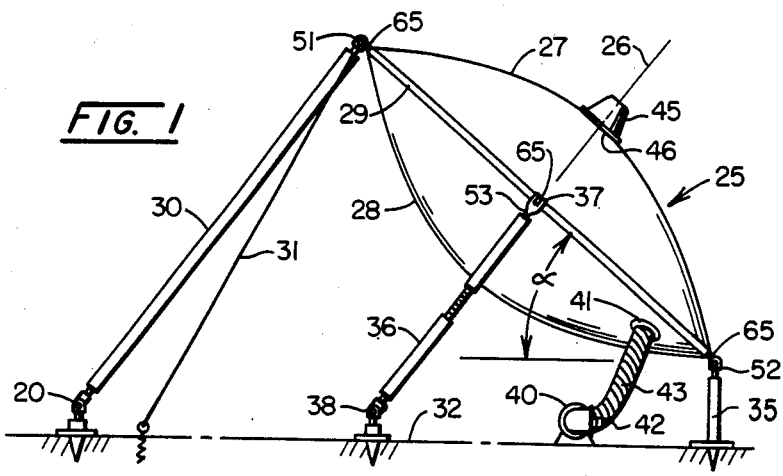
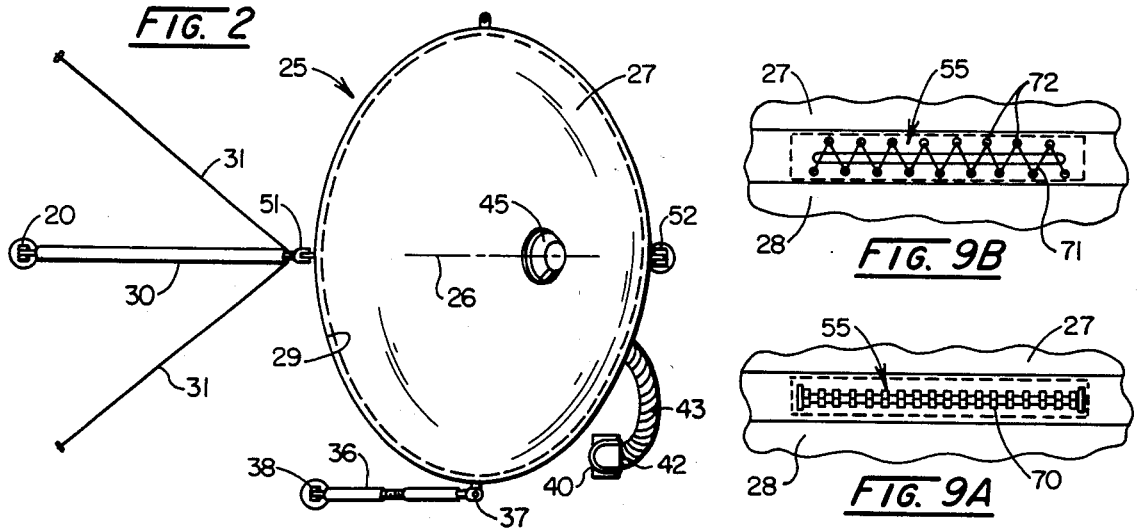
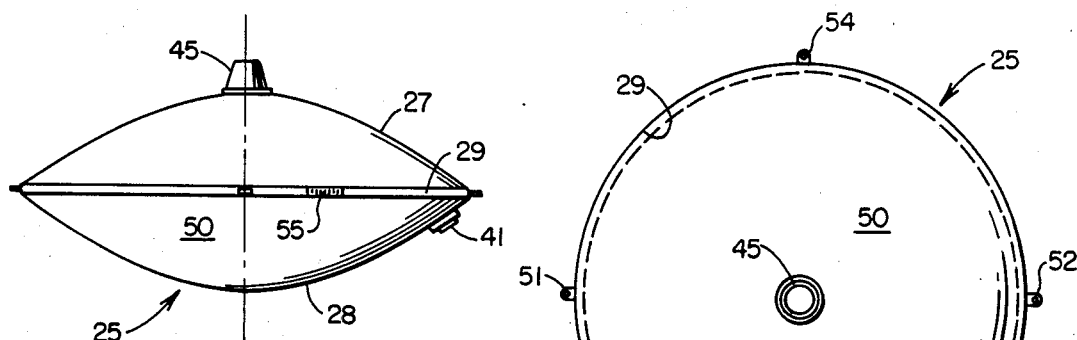
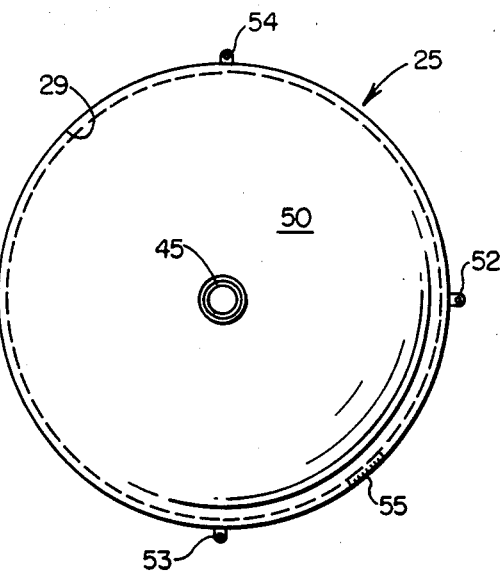

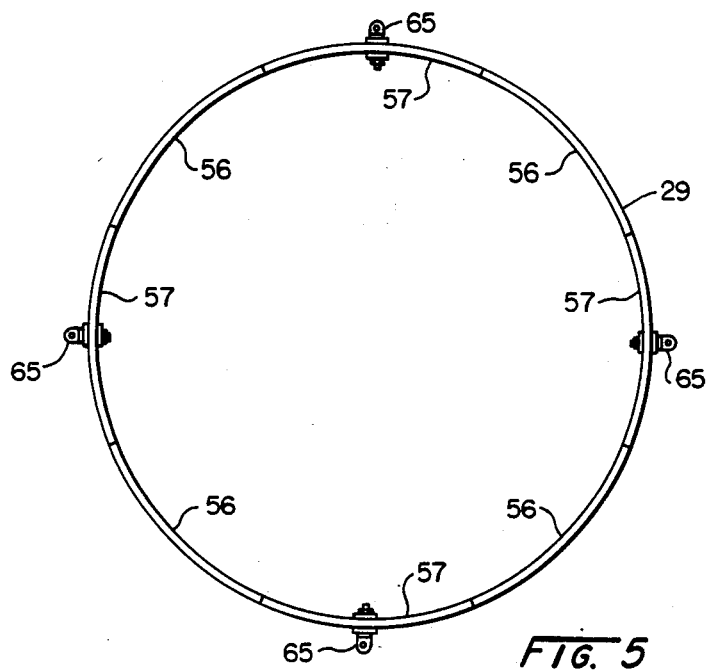
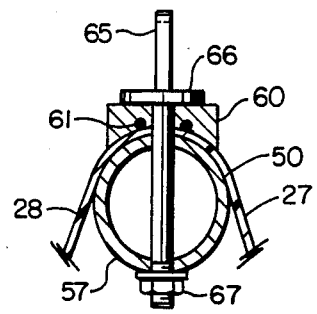
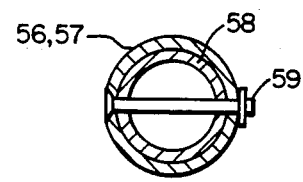
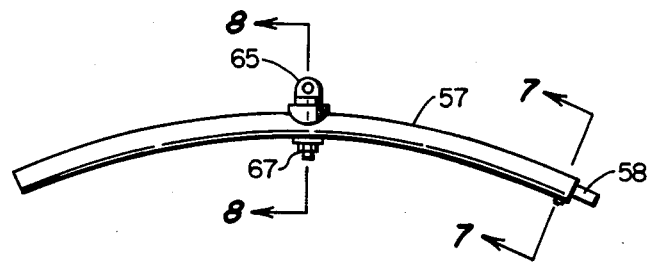
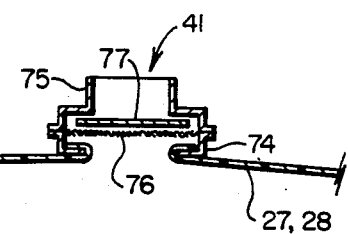
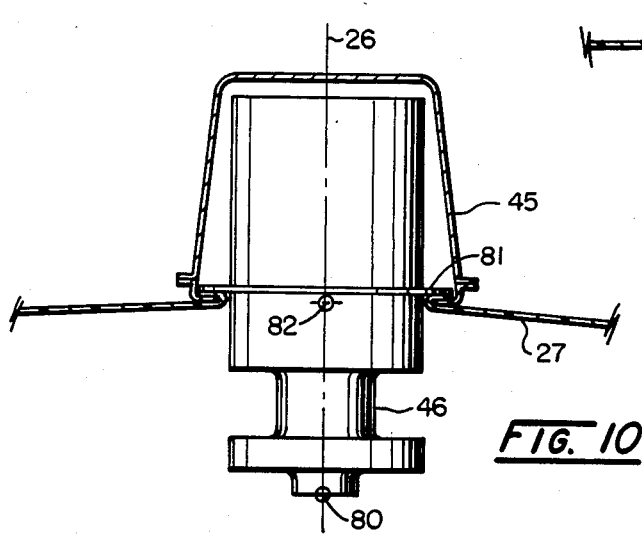

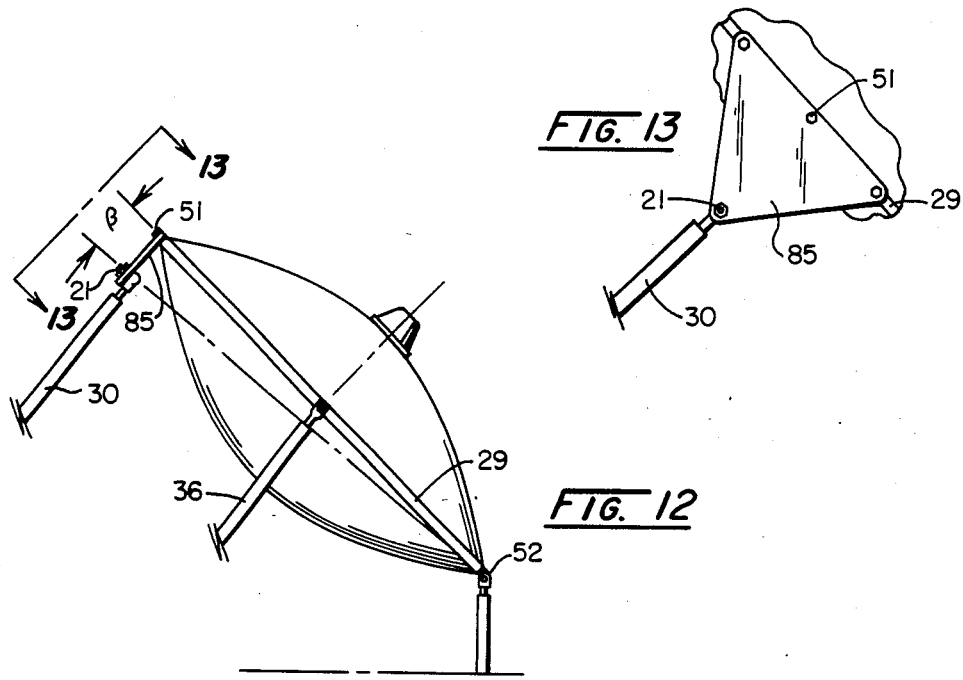
FIG. 12
FIG. 13
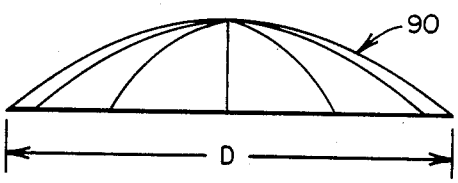
FIG. 14
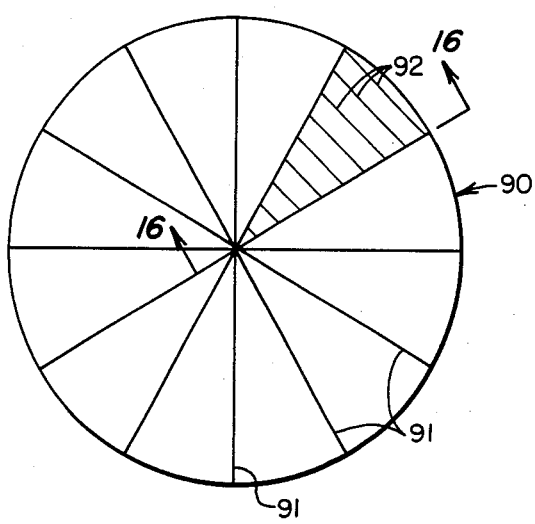
FIG. 15
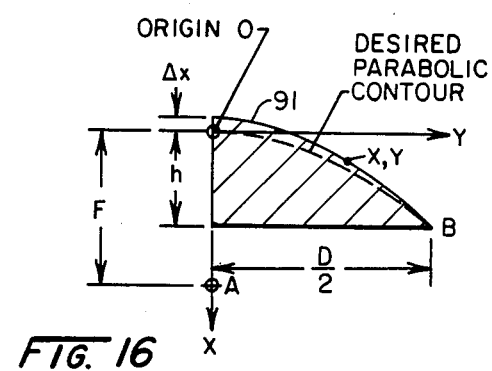
FIG. 16

INFLATABLE REFLECTOR APPARATUS AND METHOD OF MANUFACTURE

FIELD OF THE INVENTION

This invention relates to reflector structures that are used to receive and transmit wave energy, and particularly to those reflector structures that are inflatable in their process of erection and are maintained inflatable, when in use, by means of higher internal pressure than the pressure external to the structure.

BACKGROUND OF THE INVENTION

There is widespread use of concave reflector structures that admit wave energy from distant objects and collect the energy for useful purposes. For the most part, these reflector structures have been used to receive solar heat waves and electromagnetic radio, radar, and television waves. Most, and probably very nearly all, of these reflectors have been built of relatively rigid materials such as metals. Usually the internal concave reflective surface of the structure is in the general form of a parabola which is constructed to focus reflected energy at or near a point on the central longitudinal axis of the parabola at a distance conveniently near the reflector structure. Often, the point of focus is in tne vicinity of the base of the parabola, where the base is termed to be the plane that perpendicularly intersects the axis and passes through the most "forward", front edge of the reflector structure.

Parabolic reflectors may be constructed in a wide range of sizes for use with various types of antenna feeds or energy collection systems including front mounted, cassegrain, or separately mounted focal point collectors or emitters. When used as an antenna, the reflector system may be designed to function in a wide variety of applications, such as: transmission and/or reception of all types of domestic or military radio, television, and microwave communication and control signals; stationary or mobile communication and control stations; and space erectible antenna systems. When used as a solar energy collector, the reflector system may be designed to focus the sun's rays on various types of heat exchangers or photovoltaic cells. Solar energy collectors may be designed in various sizes ranging from reflectors large enough to furnish heat and air-conditioning for homes and buildings to small pocket-size packages which may be inflated for heating food or water.

Prior art in the field of rhese reflector systems, includes the development and disclosure of inflatable reflector structures in which the concave reflector surface is constructed of a non-rigid flexible material, which is maintained in position and form by means other than the strength of the material itself.

The reflector surface may be maintained in shape, form, and position as part of an inflatable spherical balloon such as that shown in U.S. Pat. No. 2,814,038—Miller. In a similar manner, U.S. Pat. No. 3,548,706—Cover Jr. et al. discloses an electrostatic means for maintaining the flexible reflector surface in position and form.

U.S. Pat. No. 3,125,758—Koehler, reveals an inflated antenna structure of a selected special shape in which the pattern of the material, i.e. the shape of the balloon surface, is constructed to bring the surface of the balloon parallel to the longitudinal axis of the reflector at the peripheral edge. This is said to overcome problems of forming the inflated shape at or near the peripheral edge eliminating the need for a rim.

U.S. Pat. No. 3,056,131—McCreary, shows an inflatable antenna having an fixed external rim and an externally supported energy collector. U.S. Pat. No. 3,413,645—Koehler, discloses an inflatable antenna of a still different elongated shape and form.

U.S. Pat. No. 2,977,596 reveals still another inflatable antenna having internal ribs or webs to maintain the reflector in proper form.

Reflector structures of the concave parabolic configuration have in recent years become known under the term "dish", and have been used to receive electromagnetic energy waves as concentrating antennas in many situations. Such structures have also been used as solar reflectors which receive and concentrate energy waves from the sun as a source of heat. However, the primary interest in inflatable reflectors has been for use as an antenna, probably because there has been more a rapidly developed interest in electromagnetic wave energy, since this is more readily concentrated in usable form than solar energy.

Most recently, reflecting satellites have been placed in orbit for the purpose of being a source of either radio or television signals. These satellites receive signals from transmitting stations on earth and reflect them back as a second source for receiving dish antennas on the earth. In recent years there has been a growing interest in individual use i.e. family or small group reception of these signals for immediate viewing on television and radio receivers. Various forms of dish antenna are being marketed for this purpose. It is perceived that there is a need for an inflatable antenna which overcomes the problems presented by previous inflatable reflector structures, and meets the objects of providing an antenna that is lighter in weight, more portable, more convenient to use, and less expensive to manufacture and sell, without the loss of structural integrity and performance that is usually associated with more flexible inflated structures.

It is a purpose of this invention to meet these objectives in the construction of a novel inflatable reflector structure, a supporting structure for an inflatable reflector system, and a method of constructing concave parabolic reflector membranes for use in a inflatable reflective structure.

Major advantages of the inflatable reflector and mount system as compared with rigid reflector structures are: greatly reduced weight and cost; perfectly formed reflector surfaces; capability for folding, storing, and shipping in a small package; capability for mounting on a variety of bases or platforms, such as rooftops; and capability for rapid remotely controlled stowing in an unobtrusive or sheltered position when not in use or in adverse weather.

More specifically it is an important object to provide an inflatable, portable, inexpensive, relatively rigid dish antenna for individualized use in receiving signals from satellites stationed above the earth.

SUMMARY OF THE INVENTION

In summary, this invention is an inflatable reflector structure for erection in an ambient atmosphere and for wave energy collection, comprising: (a) an inflatable and collapsable envelope means including a substantially fluid impervious reflective membrane surface and a substantially fluid impervious transparent membrane surface, joined together substantially at their peripheral edges, (b) a compression frame member means joined to the peripheral edges to provide structural definition for the peripheral edge of the envelope, and (c) an inflation means in communication with the interior of the envelope to provide and maintain fluid at super ambient pressure within the interior of the envelope.

This invention includes a mounting and support system for an inflatable reflector structure comprising: (a) an upper compressional strut means attached to an upper edge of the structure and joinable with a substrate, (b) at least one flexible tension member attached to the strut means, (c) a positional strut means adjustable in length, pivotally attached to the edge of the structure at a position remote from the connection of the compressional strut means, and (d) a second support strut means attached to the edge of the structure at or near the lower side and joined to the substrate.

This invention also includes a method of constructing a concave parabolic reflective membrane having a longitudinal parabolic axis of focus and a selected height of concavity, comprising: (a) providing a parabolic mold surface having an extended peripheral edge a selected distance from the axis and a height of concavity substantially equal to a geometrically calculable correct height for a parabola plus an incremental offset height, (b) forming a plurality of radial gores of the membrane material on the surface of the mold, and (c) a joining the gores together.

In addition, this invention includes a method of constructing an inflatable reflective envelope including a reflective membrane and a transparent membrane, the envelope when inflated having a longitudinal parabolic axis of focus and a uniform height of concavity with respect to each membrane, comprising: (a) constructing a parabolic mold having an external peripheral edge a selected distance from the axis and a height of concavity substantially equal to a geometrically calculable parabolic height plus an incremental offset height, (b) forming a plurality of radial gores of the membrane on the surface of the mold and joining the gores together to form a reflective membrane, (c) forming a plurality of radial gores of the transparent membrane on the surface of the mold and joining the gores together, and (d) assembling the joined membranes together at the peripheral edges thereof to form the envelope.

The foregoing and other advantages of the invention will become apparent from the following disclosure in which a preferred embodiment of the invention is described in detail and illustrated in the accompanying drawings. It is contemplated that variations in procedures, structural features and arrangement of parts may appear to the person skilled in the art without departing from the scope or sacrificing any of the advantages of the invention.

BRIEF DESCRIPTION OF THE DRAWING

FIG. 1 is an elevational side view of an inflatable reflector structure with a supporting system and inflation means of this invention.

FIG. 2 is a plan view of the structural support system and inflation means of this invention, as shown in FIG. 1.

FIG. 3 is an axial plan view of an inflated envelope of a reflector structure of this invention.

FIG. 4 is an elevation view of the envelope and structure shown in FIG. 4.

FIG. 5 is a plan view of a compression frame member means forming a part of the structure of this invention.

FIG. 6 is an enlarged plan view of a segment of the compression frame member shown in FIG. 5.

FIG. 7 is a sectional view taken on the Line 7—7 of FIG. 6.

FIG. 8 is a sectional view taken on the Line 8—8 of FIG. 6.

FIGS. 9A and 9B are elevational views of an enlarged portion of a peripheral edge of the envelope of the structure of this invention.

FIG. 10 is an elevational sectional view of a collector means of this invention.

FIG. 11 is an enlarged sectional elevational view of an inlet port and check valve forming a portion of the inflation means of this invention.

FIG. 12 is a side elevational view of another embodiment the structure reflector system of this invention.

FIG. 13 is a plan view of a portion of the embodiment of this invention shown in FIG. 12, viewed in the plane 13—13 in FIG. 12.

FIG. 14 is a side elevational view of a mold that is used in the method of constructing a inflatable membrane and envelope of this invention.

FIG. 15 is a plan view of the mold shown in FIG. 14.

FIG. 16 is a schematic sectional view of a portion of the mold shown in FIG. 15, taken on the Line 16—16 in FIG. 15.

DETAILED DESCRIPTION OF THE INVENTION

Referring to FIGS. 1 and 2 an inflatable reflector structure 25 having a longitudinal central axis 26 includes a transparent membrane 27, a reflective membrane 28 and a peripherally disposed compression frame member means 29. The structure 25 is supported at an upper edge by a compression strut 30 having rotatable clevis fittings 20 and 51 at each end, with guywires 31 attached between the strut 30 and a substrate 32.

The substrate may be the earth, or a structure on the earth, such as the roof of a building, or the roof of a vehicle, or the deck of a ship, etc.

A lower support strut 35 is connected to the periphery of the reflector structure 25 and to the substrate 32. By means of a rotatable clevis fitting 52, an adjustable positioning strut means 36 is connected by means of rotatable clevis fittings 53 between the periphery of the reflector structure at one side and the substrate at the other end. The positioning strut 36 is provided with means to adjust the distance between a connector 37 and a support 38, either by increasing or decreasing the length of the strut means 36. Such adjustment means (not shown) may be of conventional construction including a power driven screw on a threaded worm, by way of example.

An inflation means 40, such as an electric motor, driven blower or pump, is in communication with an inlet 41 from an outlet 42 through a flexible hose 43.

A housing and support means 45 is attached to the surface of the membrane 27 and holds a receiver or collector 46, more clearly shown in FIG. 10.

An envelope 50 of the reflector structure 25 is seen in further detail in FIGS. 3 and 4 in which the compression frame member means 29 is shown within the envelope formed by the transparent membrane 27 and the reflector membrane 28. Support attachment means 51, 52, 53, and 54 protrude through the membrane 50, and provide means for attachment to the struts 30, 35, and 36, respectively. A slot 55 is provided in at least one place on the periphery of the envelope 50, as shown in further detail in FIGS. 9A and 9B.

Referring to FIGS. 5 and 6, the compression frame member means 29 includes a plurality of semi-circular segments 56 and 57. Each segment 56,57 is tubular in cross section having a tubular splice member 58 as also shown in FIG. 7. Splice members 58 may be connected by a pin and cotter key 59.

Prior to the inflation of the envelope 50, segments of the compression frame member means 29 are inserted through the slot 55 singly, or in assembled groups of two or more, held in position by the pins 59.

Referring to FIG. 8, during the assembly operation, the envelope 50, the frame member means 29, and a conforming washer 60 having a sealing 0 ring 61 is placed over an aperture that is provided in the periphery of the envelope 50. An eyebolt 65 having a shoulder 66 is fastened into the aperature and a fixed nut 67. At the end of the assembly operation, after the eyebolts 65 are in place, a last segment 56 is inserted through the slot 55 and the slot 55 is closed and sealed by one of several methods, including those shown in FIG. 9.

Referring to FIG. 9A, a zipper closure including a zipper 70 closes the slot over tongue elements of the transparent membrane 27 and the reflective membrane 28. Referring to FIG. 9B the slot 55 is laced closed by laces 71 passing through eyelets 72, closing the slot over tongue elements of the transparent membrane 27 and the reflective membrane 28.

After the envelope 50 is assembled and sealed with the compression frame member means 29 inside, the supporting system is assembled by fastening the struts 30, 36, and 35 to the eyebolts 65 on the support attachment means 51, 52, 53, 54 and to substrate 32 as shown in FIG. 1.

To complete the erection of the reflector structure, the inflation means 40 is activated, pumping or blowing a fluid (usually air) through the inlet 41 causing the envelope to inflate, by creating a pressure within the envelope higher than the pressure in the ambient atmosphere. Pressure in the envelope 50 holds the frame member means 29 joined to the envelope by contact at the periphery. A sleeve formed of envelop material could be provided in the periphery of the envelope to hold the frame means 29.

Means responsive to the pressure in the envelope 50, such as a pressure switch may be provided to turn the inflation means on and off, as required to automatically maintain the internal pressure in the envelope.

When the envelope is inflated, the surfaces of the membranes 27, 28 are complimentary in shape, and a mirror image in form, to provide a balance of forces on opposite sides of the joinder of the membranes. This provides for maximum rigidity and higher internal pressure without distortion.

Referring to FIG. 11, the inlet port 41 includes a retainer ring 74 fastened to the membrane surface 27 or 2,8 and a fitting 75 for connection to the hose 43. A screen 76 and a stopper 77 serve to prevent debris from entering the envelope, and to act as a check valve preventing the escape of the fluid within the envelope.

In a preferred use of this invention, the reflector structure 25 is constructed to serve as an antenna for receipt of electromagnetic wave energy signals from a satellite moving with the rotation of the earth. Signals from the satellite source are received and collected on the reflector membrane 28 surface from which they are reflected to a focal point provided by the parabolic shape formed by the reflective membrane when the envelope 50 is inflated.

Referring to FIG. 10, the collector 46 is a receiver amplifier with an antenna focal point at the focus point 80 of the parabolic reflector membrane 28. The receiver 46 is mounted on a plate 81 that is attached to the transparent membrane 27, preferrably with the center of gravity of the receiver equipment 46 at a point 82, where the longitudinal axis of the reflector structure 16 intersects a tangent to the surface of the transparent membrane 27.

When the receiver 46 is mounted on the plate 81 that is attached to transparent member 27, and the envelope is inflated to maximum rigidity as described above, the receiver 46 is supported entirely by membrane forces in the membranes as a result of the internal pressure in the envelope 50.

Another embodiment of a supporting system for the inflatable reflector structure of this invention is shown in FIG. 12. In this embodiment, the supporting strut means, and guywires, are the same as those on the embodiment shown in FIG. 1 , with the exception that a declination plate 85 is provided at the top of compression strut 30 between the upper end and the compression frame member means 29 at the peripheral of the envelope 50. As seen in FIG. 13, the declination plate 85 is generally triangular in shape and provides a compensation according to the angle B shown in FIG. 12.

The angle B is the amount that the longitudinal axis 26 must be depressed with respect to the latitude of the reflector site to view satellites in equatorial geosynchronous orbits 22,300 miles above the surface of the earth. With support points 20, 21, and 52 aligned along the north south axis of the earth, the reflector may then be rotated about joints 21 and 52 to view any satellite in such an orbit within the line of sight of the antenna.

The guy wire 31 tension members could be replaced by more rigid tension members, such as struts without deporting from the functional concepts presented, although it believed that some convenience, weight, and cost advantage would probably be lost.

FIG. 14, 15, and 16 illustrate a mold 90 and method of fabricating the front and back parabolic membrane surfaces 27 and 28 from flat sheet material such that when inflated the flat pattern sheets will deform to a smooth double contoured surface of predetermined dimensions. The desired shape is achieved by dividing the paraboloid into a plurality (twelve are shown) of equal segments and constructing a mold 90 of the desired diameter D with straight line elements 92 between each of the equally spaced contour templates 91. The shape of the contour templates 91 is derived in the following manner:

1. Select the dimensions D (diameter), F (focal length), and h (height) of the desired paraboloid.
2. The desired parabolic contour is then defined by the loci of points determined by the equation $y^2 = 4FX$ where x = distance from the origin O
    Y = distance perpendicular to axis O-x
    F = distance from the origin O to the focal point A
3. Establish the shape of the contour templates by pivoting the parabolic contour about point B until the center line height h is increased by the amount $$\Delta x = \frac{h \sin\left(\frac{360°}{n}\right)}{n}$$

where n=number of segments

The above calculation of offset dimension Δx is valid for paraboloids having F/D ratios in the range of 0.300 to 0.375. This range is required for locating the focal point A of the reflective parabolic surface 28 in close proximity to the origin O of the opposing transparent parabolic membrane 27. This arrangement allows an associated antenna feed or heat exchanger to be mounted on the equipment mounting ring 81 attached to the transparent membrane 27 at a point where the collected energy is focused.

Fabrication of the transparent front face membrane surface 27 and the back face reflective membrane surface 28 is accomplished by cutting flat pattern gores from the transparent and reflective sheet materials to fit the single contour surface of the mold 90 formed by straight line elements between contour templates 91. Adjacent gores are joined by heat sealing or bonding the meridional edges at template locations. An airtight envelope is then formed by joining the circumferential edges of the transparent 27 and reflective membrane surfaces 28.

The transparent and reflective membrane surfaces of the reflector are preferrably constructed of fluid impervious materials which exhibit the following physical properties: (1) Are dimensionally stable under tension loadings; (2) provide a barrier to the fluid used to inflate the envelope; (3) are weather resistant, (4) are foldable; and (5) may be joined by heat sealing or bonding. When used as a receiver or transmitter of microwave signals the transparent surface may be fabricated from sheets of radomly oriented fiber reinforcements, laminated between sheets of a plastic film material such as vinyl. A recommended fiber reinforcement material is a spunbonded olefin manufactured commercially by the DuPont company and marketed under the trademark "Tyvek". This material provides excellent isotropic tensile strength and stiffness required to maintain the selected parabolic contour as well as to support a receiver or collector entirely by membrane tension forces. The reflective membrane surface is preferrably constructed of the same materials as the transparent membrane except that a thin layer of aluminum foil is added to the laminate between the outer vinyl sheets.

When used as a solar energy concentrator the transparent membrane is constructed of an optically transparent film having adequate tensile strength and creep resistant properties. The solar reflector surface may be constructed of the same materials as the microwave reflector except that an optically reflective film, such as a solar collection film manufactured by 3M Company, is laminated to the front surface of the fiber reinforced laminated substrate.

An additional feature of the support system described above is the capability to rapidly raise or lower the reflector structure. To lower the reflector from the upright position shown in FIG. 1 it is only necessary to disconnect the guy wire 31 from the substrate 32 and allow the reflector and mount to rotate about support 30 and 35. This will cause the connection 51 to move downward until the back face membrane 28 touches the substrate. The envelope 50 may then be deflated resulting in further downward motion until reflector structure 25 comes to rest on the ground with the envelope flattened. The plane of the compression frame member means 29 may be programmed to come to rest parallel to the ground plane or to a sloping plane such as a rooftop by adjusting the length of the positioning strut 36 prior to stowing. Erection is accomplished by inflating the envelope 50 and pulling on guy wire 31 to bring the structure to a predetermined upright viewing position.

All or part of the inflation, erection, and positioning operations described above may be performed automatically and remotely if desired. Remote inflation or deflation is accomplished by the addition of an electrically driven reversible blower, remote automatic positioning is accomplished by the addition of a device to extend or shorten the positioning strut 36, and remote erection is accomplished by the addition of a winch to shorten or lengthen the guy wires 31. The position and length of support struts and guy wires may be varied to accomodate various mount locations and viewing functions such as rooftop mounting and tracking the sun for solar energy collection.

The lightweight membrane construction of the inflatable reflector structure make it convenient to fold and package a large aperature reflector in a small, compact bundle. The removable segmented compression ring (3), the compression strut (27), and the positioning strut 36 may be fabricated in short lengths suitable for compact packaging along with coiled guy wires. These features are desirable for packaging the reflector system for sale, storage, or transporation, and could be used in a commercial or military communication system to rapidly assemble, disassemble, and move a large aperature antenna from one location to another.

The packaging arrangement also affords the possibility of erecting very large lightweight antennae, solar collectors, or mirrors in space. For space applications, the reflector system may be inflated with compressed gas and positioned by small jet units mounted on the compression ring of the structure in lieu of the ground based mounting system described above.

Although a preferred embodiment of the invention has been herein described, it will be understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalence thereof.

What is claimed is:

1. An inflatable reflector structure for erection in an ambient atmosphere for wave energy collection, comprising:
    a. an inflatable and collapsable envelope means including a substantially fluid impervious reflective membrane surface and a substantially fluid impervious transparent membrane surface, joined together substantially at their peripheral edges, and
    b. a compression frame member means inserted within the envelope and joined to the peripheral edges by contact with the interior of the envelope as a result of the pressure in the envelope to provide structural definition for the peripheral edge of the envelope, and c. an inflation means in communication with the envelope to provide and maintain fluid at above ambient atmospheric pressure within the interior of the envelope.

2. A structure according to claim 1 wherein the reflecting membrane surface is substantially parabolic in form when inflated.

3. A structure according to claim 1 wherein the reflective membrane surface and the transparent membrane surfaces are substantially complimentary in shape and a mirror image in form to provide balance of forces on opposite sides of the joinder of the membranes when the envelope is inflated.

4. A structure according to claim 3 wherein a receiver or collector mounted to the transparent or reflective surface is supported entirely by membrane tension forces in the membrane, created by the compression frame member means at the edges.

5. A structure according to claim 1 wherein the fluid of inflation is air or gas.

6. A structure according to claim 1 wherein the inflation means is a blower or pump.

7. A structure according to claim 1 wherein the fluid impervious transparent membrane is constructed of an optically transparent film.

8. A structure according to claim 1 wherein the fluid impervious transparent membrane is constructed of a laminate of fiber reinforced sheet and protective heat sealable outer surface films.

9. A structure according to claim 1 wherein the substantially fluid impervious reflective membrane is constructed of a laminate of fiber reinforced plastic sheet, metal foil, and protective heat sealable outer surface films materials.

10. A structure according to claim 1 wherein the fluid impervious reflective membrane is constructed of a laminate of fiber reinforced sheet, optically reflective film, and protective heat sealable outer surface film.

11. A structure according to claim 1 wherein the transparent membrane surface is provided with means to support a collector means for wave energy reflected from the reflective membrane surface.

12. A structure according to claim 11 wherein the reflective membrane surface is constructed as an antenna to receive electromagnetic energy, and the collector means is a receiver for the signals reflected from the reflective membrane.

13. An inflatable reflector structure for erection in an ambient atmosphere for wave energy collection, comprising:
   a. an inflatable and collapsable envelope means including a substantially fluid impervious reflective membrane surface and a substantially fluid impervious transparent membrane surface, joined together substantially at their peripheral edges, and
   b. a compression frame member means of substantially circular or ring shape comprised of a plurality of segments which are joined together and inserted through at least one aperature or slot in the envelope and joined to the peripheral edges to provide structural definition for the peripheral edge of the envelope, and
   c. an inflation means in communication with the envelope to provide and maintain fluid at above ambient atmospheric pressure within the interior of the envelope.

14. A structure according to claim 13 wherein the compression frame member means is tubular in construction.

15. A structure according to claim 13 wherein the compression frame member means is provided with at least one support attachment means for projection through the envelope, for the external attachment of supports.

16. A structure according to claim 15 wherein the supporting attachment means is a rotatable clevis fitting.

* * * * *